Patented June 3, 1952

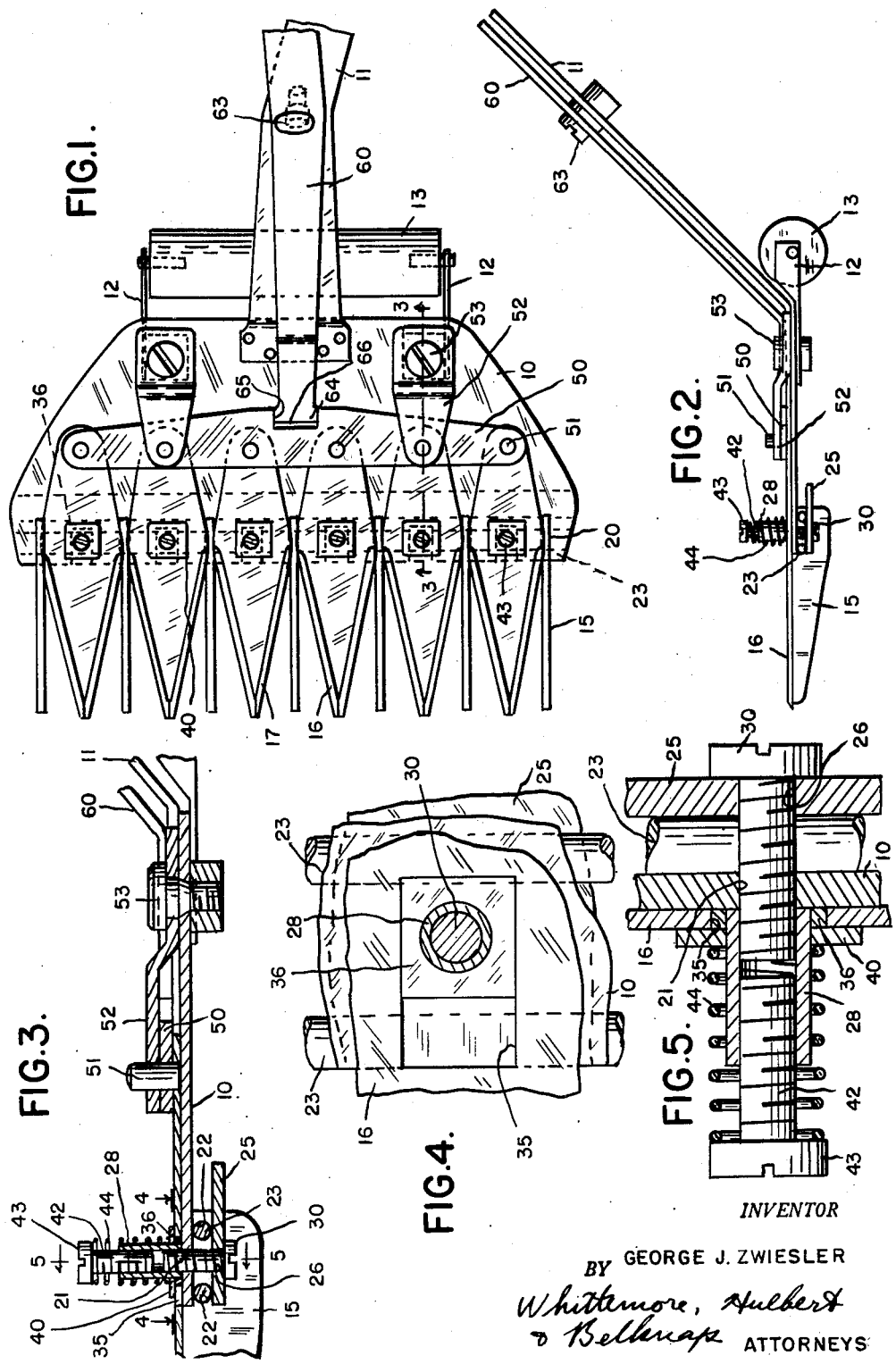

2,598,873

UNITED STATES PATENT OFFICE 2,598,873

HAND-OPERATED OSCILLATING AND LATERALLY MOVING CUTTER

George J. Zwiesler, Davisburg, Mich.

Application February 24, 1947, Serial No. 730,460

18 Claims. (Cl. 56—242)

The present invention relates to a hand mower and more particularly to a mower useful in trimming grass or the like.

It is an object of the present invention to provide a mower of the type described characterized by the shearing action between cutting elements thereof.

It is a further object of the present invention to provide a mower of the type having novel mechanism for supporting relatively movable comb and blade elements thereon.

It is a further object of the present invention to provide a mower of the type employing a plurality of pivoted blades movable over fixed comb elements constructed and arranged to provide a motion between the blades and comb elements generally longitudinal of the cutting blades.

It is a feature of the present invention to provide, in a mower of the type described, a plurality of pivoted and slidably mounted cutting blades in conjunction with a toggle bar connected to all of said cutting blades and constrained to move only in an arcuate path of relatively short radius.

Other objects and features of the invention will become apparent as the description proceeds, especially when considered in conjunction with the accompanying drawings, wherein:

Figure 1 is a plan elevation of the functional portion of the hand mower;

Figure 2 is a side elevation of the structure illustrated in Figure 1;

Figure 3 is a fragmentary enlarged section on the line 3—3 of Figure 1;

Figure 4 is a fragmentary enlarged section on the line 4—4 of Figure 3; and

Figure 5 is an enlarged fragmentary section on the line 5—5 of Figure 3.

Referring now to the drawings, the mower comprises a base 10 to which is rigidly secured a handle 11. At the rear of the base 10 are provided a pair of brackets 12 between which is pivoted a supporting roller 13 which may conveniently be formed of wood.

Projecting forwardly from the front edge of the base 10 are a plurality of comb blades 15. Associated with the comb blades 15 are a plurality of cutter blades 16, each of which is mounted for pivotal and sliding movement relative to the base 10. The upper edge of the comb blades 15 is preferably slightly hollow ground and the cutting blades 16 have ground cutting edges, as indicated at 17, which are slidable over the hollow ground top edges of the combs 15 to effect a cutting action in conjunction therewith.

In the present case novel means are employed for supporting the cutting blades rigidly at the forward edge of the base and at the same time securing the cutting blades 16 adjacent the forward edge of the base 10 for pivotal and simultaneous sliding movement with respect thereto. The top rear corners of the combs 15 are received in slots provided at the forward edge of the base 10, these slots being indicated at 20 in Figure 1. Intermediate the slots 20 and spaced equally from adjacent slots are a plurality of openings 21 which are best seen in Figure 5. The combs 15 are provided with pairs of aligned openings 22 through which are passed locating pins 23 in a relationship best illustrated in Figure 3. In order to clamp the locating pins 23 firmly in position against the under surface of the forward edge of the base 10, there is provided a clamping plate 25 having openings 26 formed therein in alignment with the openings 21 formed in the base 10. An internally threaded hollow sleeve 28 is provided, the lower end of which engages the upper surface of the base 10 surrounding the openings 21, and a clamping bolt 30 passes upwardly through the clamping plate 25 and is threaded within the interior of the sleeve 28. It will be apparent that thus a rigid clamping force is applied to the locating pins 23 by the clamping plate 25.

Part of this same structure is employed to provide pivots for supporting the cutting blades 16. Each of the cutting blades 16, as best illustrated in Figure 4, is provided with an elongated slot 35 which in this figure is shown as of rectangular shape. The rear portion of the cutting blades 16 rests upon the upper surface of the base 10 which is coplanar with the top edge surfaces of the combs 15. Received within the elongated slot 35 is a guide bushing 36 which has a central opening therethrough of a size to fit closely about but to permit turning relative to the internally threaded sleeve 28. This construction permits bodily movement of the cutting blades 16 from front to back with respect to the base 10, or in other words, longitudinally of their length. At the same time, since the bushing 36 is rotatable about the sleeve 28, it permits rotation of the cutting elements 16 about the axis established by the sleeve 28.

Superimposed over the bushings 36 are washers 40, best seen in Figures 3 and 5. Threaded within the upper open end of the sleeve 28 are bolts 42, the heads 43 of which provide a seat for compression springs 44. The springs 44 bear upon the washer 40 and retain cutting blades 16 and bushings 36 pressed down firmly against the upper surface of the base 10 and also cause the forward cutting edges 17 of the cutting blades 16 to be in accurate sliding and cutting relation with respect to the hollow ground upper surfaces of the combs 15.

In order to impart the specific motion to the cutting blades which enhances their cutting action, the rear ends of each of the cutting blades 16 are connected to an actuating or toggle bar 50, the connection thereto being effected by pivot pins as indicated at 51. The toggle bar 50 is supported by short L-shaped links 52 which in turn are mounted for pivotal movement with respect to the base 10 about pivots 53. It will be observed that the links 52 are relatively short and that as a result of their construction and position, the toggle bar 50 is constrained to move only in an arcuate path of relatively short radius, which path is convexly and symmetrically shaped and disposed with respect to the rear ends of the cutting blades 16.

In order to impart motion to the actuating or toggle bar 50, a pivoted hand-operated lever 60 is provided, the bar 50 being pivoted to the handle 11 by a pivot connection indicated at 63. The lower end of the lever 60 has a portion 64 loosely engaging in a recess 65 formed at the rear end of the bar 50. It will be apparent that the portion 64 of the lever 60 moves about an arc concentric with the pivot axis 63 whereas the bar 50 moves in a path determined by the arcs of movement of the ends of the short links 52. In order to permit this dissimilar movement between the end of the lever 60 and the bar 50, the connection therebetween is relatively loose and the recess is shaped so that in the central position illustrated in Figure 1 there is substantial clearance between the end of the lever 60 and the bottom of the recess 65, such clearance being indicated at 66.

With the foregoing structural arrangement in mind, it is apparent that a new and improved cutting action is obtained by this mower. Cutting blades 16 not only rock about pivot axes determined by sleeves 28 but this motion has superimposed thereon a bodily sliding movement relative to the fixed combs 15. Thus as the toggle or actuating bar 50 is moved in either position from the intermediate position illustrated in Figure 1, its arcuate path causes the cutting blade 16 to rock about fixed pivots and at the same time the blades are caused to move toward the rear of the base 10, thus inducing a shearing action which is very effective to cut grass, weeds or the like. It will further be apparent that the shearing action is most effective at the time when its benefits are most needed. Thus as the portion of each cutting blade adjacent its tip passes over the fixed comb, the shearing effect due to the bodily movement of the cutting blades to the rear is at a maximum.

The novel mechanism for supporting the fixed combs 15 rigidly in properly aligned position with respect to the base 10 and for supporting the cutting blades 16 or a simultaneous rocking and reciprocating motion materially increases the economy with which the device may be produced and insures its proper adjustment and accordingly its proper functioning.

While there is illustrated and described a single preferred embodiment of improved hand mower, it will be appreciated that this full description has been given merely to enable those skilled in the art to practice the invention, the scope of which is indicated by the appended claims.

What I claim as my invention is:

1. A device of the type described comprising a base, a plurality of fixed blades extending forwardly therefrom, cutting blades carried by said base and having lateral cutting edges movable against surfaces of said fixed blades, said cutting blades each having an elongated slot extending generally longitudinally thereof intermediate its ends, pivot pins carried by said base extending through said slots, a bar pivotally connected to the rear ends of said cutting blades, and actuating means for said bar including short links constraining said bar to move in a curved path of relatively short radius.

2. A device of the type described comprising a base, a plurality of fixed blades extending forwardly therefrom, cutting blades carried by said base and having lateral cutting edges movable against surfaces of said fixed blades, said cutting blades each having an elongated slot extending generally longitudinally thereof intermediate its ends, pivot pins carried by said base extending through said slots, a bar pivotally connected to the rear ends of said cutting blades, and actuating means for said bar including short links constraining said bar to move in a curved path of relatively short radius, the curved path being symmetrically and tangentially disposed to the pivot connection between said bar and cutting blades.

3. A device of the type described comprising a base, a plurality of fixed blades extending forwardly therefrom, cutting blades carried by said base and having lateral cutting edges movable against surfaces of said fixed blades, said cutting blades each having an elongated slot extending generally longitudinally thereof intermediate its ends, pivot pins carried by said base extending through said slots, guide bushings surrounding said pins and relatively slidable in said slots, resilient means urging said cutting blades against the surfaces of said fixed blades, a bar pivotally connected to the rear ends of said cutting blades, and actuating means for said bar including short links constraining said bar to move in a curved path of relatively short radius.

4. A device of the type described comprising a base, a plurality of fixed blades extending forwardly therefrom, cutting blades carried by said base and having lateral cutting edges movable against surfaces of said fixed blades, said cutting blades each having an elongated slot extending generally longitudinally thereof intermediate its ends, pivot pins carried by said base extending through said slots, a bar pivotally connected to the rear ends of said cutting blades, actuating means for said bar including short links constraining said bar to move in a curved path of relatively short radius, and an operating handle loosely connected to said bar.

5. In a mower of the type described, a base having slots in its forward edge and a series of openings intermediate said slots, comb blades extending forwardly from said base and having portions received in said slots, said comb blades having pairs of aligned openings disposed below the forward edge of said base, locating pins extending through said aligned openings and bearing against the underside of said base, a clamping plate beneath said pins, and clamping means cooperating with the series of openings in said base for holding said plate against said pins.

6. In a mower of the type described, a base having slots in its forward edge and a series of openings intermediate said slots, comb blades extending forwardly from said base and having portions received in said slots, said comb blades having pairs of aligned openings disposed below the forward edge of said base, locating pins extending through said aligned openings and bearing against the underside of said base, a clamping plate beneath said pins, and clamping means extending between said pins and cooperating with the series of openings in said base for holding said plate against said pins.

7. In a mower of the type described, a base having forwardly extending fixed blades thereon, a plurality of cutter blades individually slidably and pivotally mounted on said base and movable in cutting relation against said fixed blades, a bar pivotally connected to each of said cutting blades, and actuating means for said bar constraining said bar to movement only in a curved path of relatively short radius.

8. In a mower of the type described, a base having forwardly extending fixed blades thereon, a plurality of cutter blades individually slidably and pivotally mounted on said base and movable in cutting relation against said fixed blades, a bar pivotally connected to each of said cutting blades adjacent the rear ends thereof, and actuating means for said bar constraining said bar to movement only in a curved path of relatively short radius, said path being related to the pivot mountings of said cutting blades such that transverse movement of all of said cutting blades across said fixed blades in cutting direction is accompanied by a bodily movement of said cutting blades along said fixed blades in a direction toward said base.

9. In a mower of the type described, a base having forwardly extending fixed blades thereon, a plurality of cutter blades individually slidably and pivotally mounted on said base and movable in cutting relation against said fixed blades, a bar pivotally connected to each of said cutting blades, and actuating means for said bar including short links pivotally connected between said bar and said base and constraining said bar to movement only in a curved path of relatively short radius.

10. In a mower of the type described, a base having forwardly extending fixed blades thereon, a plurality of cutter blades individually slidably and pivotally mounted on said base and movable in cutting relation against said fixed blades, a bar pivotally connected to each of said cutting blades, actuating means for said bar including short links pivotally connected between said bar and said base and constraining said bar to movement only in a curved path of relatively short radius, and an operating lever having a loose connection with said bar for moving said bar.

11. In a mower of the type disclosed, a base having slots in its forward edge and a series of openings intermediate said slots, comb blades in said slots and extending forwardly from said base, said comb blades having aligned openings beneath the forward edge of said base, locating pins in said aligned openings, a clamping plate beneath said pins, cutting blades each having an elongated longitudinal slot intermediate its ends, internally threaded sleeves extending through said slots and seated against said base, screws bearing against the underside of said plate and passing between said pins and threaded into said sleeves through said series of openings, washers surrounding said sleeves and bearing againt said cutting blades, screws in the upper ends of said sleeve, and compression springs between said screws and said washers.

12. In a mower of the type disclosed, a base having slots in its forward edge and a series of openings intermediate said slots, comb blades in said slots and extending forwardly from said base, said comb blades having aligned openings beneath the forward edge of said base, locating pins in said aligned openings, a clamping plate beneath said pins, cutting blades each having an elongated longitudinal slot intermediate its ends, internally threaded sleeves extending through said slots and seated against said base, screws bearing against the underside of said bar and passing between said pins and threaded into said sleeves through said series of openings, washers surrounding said sleeves and bearing against said cutting blades, screws in the upper ends of said sleeves, compression springs between said screws and said washers, and actuating means for effecting pivotal movement of said cutting blades about said sleeves and bodily movement of said cutting blades longitudinally with respect to said sleeves.

13. A mower comprising a plurality of forwardly extending fixed blades, a plurality of individually movable cutting blades, means mounting each of said cutting blades for rocking movement transversely of and in cutting relation to the adjacent fixed blades about a pivot point spaced rearwardly from the front of said cutting blade, and means for effecting forward and rearward translations of all of said cutting blades relative to their pivot points in timed relation to rocking movement thereof, said last means comprising a transverse bar pivotally connected to each of said cutting blades, and link means constraining movement of said bar to oscillation in a curved path.

14. A mower comprising a plurality of forwardly extending fixed blades, a plurality of individually movable cutting blades, means mounting each of said cutting blades for rocking movement transversely of and in cutting relation to the adjacent fixed blades about a pivot point spaced rearwardly from the front of said cutting blade, and means for effecting forward and rearward translations of all of said cutting blades relative to their pivot points in timed relation to rocking movement thereof, said last means comprising a transverse bar pivotally connected to each of said cutting blades, and means constraining movement of said bar to oscillation in a curved path.

15. A mower comprising a plurality of forwardly extending fixed blades, a plurality of forwardly extending movable cutting blades, means mounting said movable blades for swinging movement from an intermediate position in which they are generally parallel to said fixed blades to positions at either side of intermediate position to effect a shearing action in conjunction with the adjacent fixed blades, said mounting means comprising fixed pivots for said movable blades and slidable connection means extending longitudinally of said movable blades between each of said fixed pivots and the movable blade mounted thereon, actuating means connected to all of said movable blades for swinging said movable blades about their pivots, and for simultaneously moving said blades longitudinally relative to their fixed pivots.

16. A mower as defined in claim 15, in which said movable blades include portions extending rearwardly of the said fixed pivots, and said actuating means comprises guide means connected to the rearwardly extending portion of all of said movable blades and movable in an arcuate path symmetrically disposed to a front-to-back direction, to provide increased shearing action and increased leverage as the effective cutting zone approaches the front end of the movable blades.

17. A device of the type described comprising a base, a plurality of fixed blades extending forwardly therefrom, cutting blades carried by said base and having lateral cutting edges movable against surfaces of said fixed blades, said cutting blades each having an elongated slot extending generally longitudinally thereof intermediate its ends, pivot pins carried by said base extending through said slots, means pivotally interconnecting the rear ends of said cutting blades to require like movement thereof, guide means comprising short links having their rear ends pivoted to said base, and their forward ends pivoted to cutting blades rearwardly of the pin and slot connections between said cutting blades and said base, and actuating means for moving said cutting blades as aforesaid.

18. A mower comprising a base having a plurality of forwardly extending fixed blades thereon, a plurality of elongated movable cutting blades carried by said base, slidable pivot supports connecting said cutting blades at points intermediate their ends to said base for rocking movement about axes transverse to their length and for sliding generally longitudinally thereof, means interconnecting all of said movable cutting blades for causing like motion thereof, and short links having their rear ends pivoted to said base and their front ends pivoted to the movable cutting blades rearwardly of the said slidable pivot supports thereof, and actuating means for effecting movement of said movable cutting blades.

GEORGE J. ZWIESLER.

REFERENCES CITED

The following references are of record in the file of this patent:

UNITED STATES PATENTS

| Number | Name | Date |
|---|---|---|
| 974,653 | Frazer | Nov. 1, 1910 |
| 1,005,287 | Ogden | Oct. 10, 1911 |